(12) United States Patent
Lasserre et al.

(10) Patent No.: US 10,250,893 B2
(45) Date of Patent: Apr. 2, 2019

(54) METHOD AND DEVICE FOR ENCODING BOTH A HIGH-DYNAMIC RANGE FRAME AND AN IMPOSED LOW-DYNAMIC RANGE FRAME

(71) Applicant: INTERDIGITAL VC HOLDINGS, INC., Wilmington, DE (US)

(72) Inventors: Sebastien Lasserre, Thorigne Fouillard (FR); Pierre Andrivon, Liffre (FR); Philippe Bordes, Laille (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 146 days.

(21) Appl. No.: 15/180,214

(22) Filed: Jun. 13, 2016

(65) Prior Publication Data

US 2016/0366423 A1 Dec. 15, 2016

(30) Foreign Application Priority Data

Jun. 15, 2015 (EP) ..................................... 15305926

(51) Int. Cl.
*H04N 19/186* (2014.01)
*G09G 3/34* (2006.01)
(Continued)

(52) U.S. Cl.
CPC ......... *H04N 19/186* (2014.11); *G09G 3/3406* (2013.01); *H04N 19/172* (2014.11);
(Continued)

(58) Field of Classification Search
CPC ... H04N 19/186; H04N 19/503; H04N 19/172
See application file for complete search history.

(56) References Cited

U.S. PATENT DOCUMENTS

| | | | |
|---|---|---|---|
| 8,873,877 B2 | 10/2014 | Su et al. | |
| 2005/0281473 A1* | 12/2005 | Kim | ..................... H04N 19/105 382/236 |

(Continued)

FOREIGN PATENT DOCUMENTS

| | | |
|---|---|---|
| EP | 1478189 | 11/2004 |
| EP | 2890129 | 7/2015 |

(Continued)

OTHER PUBLICATIONS

Lasserre et al, High dynamic range video coding, 16 JCT-VC Meeting, San Jose, Jan. 5, 2014.

(Continued)

*Primary Examiner* — Marnie A Matt
(74) *Attorney, Agent, or Firm* — Brian J. Dorini; Ronald Kolczynski

(57) ABSTRACT

The present disclosure generally relates to a method and device for encoding a frame. The method includes the steps of determining a backlight frame from the frame, calculating a residual frame responsive to the frame and the backlight frame, and predictive-encoding of the residual frame using a predictor of the residual frame calculated from an imposed frame (IMF), where the imposed frame is a low-dynamic version of the frame to be encoded. The disclosure relates also a method and device for decoding at least one bitstream representing a frame.

18 Claims, 5 Drawing Sheets

(51) Int. Cl.
*H04N 19/98* (2014.01)
*H04N 19/50* (2014.01)
*H04N 19/503* (2014.01)
*H04N 19/172* (2014.01)

(52) U.S. Cl.
CPC ........... *H04N 19/50* (2014.11); *H04N 19/503* (2014.11); *H04N 19/98* (2014.11); *G09G 3/3426* (2013.01); *G09G 2320/0646* (2013.01); *G09G 2340/02* (2013.01); *G09G 2350/00* (2013.01)

(56) References Cited

U.S. PATENT DOCUMENTS

| | | | |
|---|---|---|---|
| 2007/0201560 A1* | 8/2007 | Segall | H04N 19/61 375/240.24 |
| 2009/0097549 A1* | 4/2009 | Kim | H04N 19/70 375/240.03 |
| 2010/0172411 A1* | 7/2010 | Efremov | H04N 19/136 375/240.12 |
| 2013/0223531 A1* | 8/2013 | Garbas | H04N 19/105 375/240.14 |
| 2014/0044372 A1* | 2/2014 | Mertens | H04N 19/46 382/248 |
| 2014/0219558 A1* | 8/2014 | Teng | G06T 9/00 382/166 |
| 2014/0369410 A1* | 12/2014 | Olivier | H04N 19/597 375/240.12 |
| 2015/0003749 A1 | 1/2015 | Kim et al. | |
| 2015/0341675 A1* | 11/2015 | Su | H04N 19/117 375/240.15 |
| 2015/0358646 A1* | 12/2015 | Mertens | H04N 1/6058 382/166 |
| 2016/0227227 A1* | 8/2016 | Deshpande | H04N 19/186 |
| 2016/0234515 A1* | 8/2016 | Mertens | G11B 27/11 |
| 2016/0307602 A1* | 10/2016 | Mertens | G11B 27/11 |
| 2017/0094281 A1* | 3/2017 | Chalmers | H04N 19/14 |

FOREIGN PATENT DOCUMENTS

| | | |
|---|---|---|
| WO | WO2012147022 | 11/2012 |
| WO | WO2014107255 | 7/2014 |
| WO | WO2015097118 | 7/2015 |
| WO | WO2015097168 | 7/2015 |

OTHER PUBLICATIONS

Touze et al, HDR Video coding based on local LDR quantization,HDRi2014—2nd International Conference and SME Workshop on HDR Imaging, Mar. 4, 2014, URL: http://wftp3.itu.int/av-arch/jctvc-site/ No. JCTVC-P0159.

Lasserre et al, Modulation-based HDR video coding with SDR backward compatibility, 21st JCT-VC Meeting, Warsaw, PL, Jun. 19-26, 2015.

Mantiuk et ai., "Backward Compatible High Dynamic Range MPEG Video Compression", ACM Transactions on Graphics, vol. 25, No. 3, Jul. 2006, pp. 713-723.

Chinnock, C., "Dolby Reveals Details Behind Dolby Vision", Display Central, http://www.display-central.com/free-news/display-daily/dolby-reveals-details-behind-dolby-vision-2/, Jan. 7, 2014, pp. 1-2.

ITU-T H.264 Standard, "Advanced video coding for generic audio-visual Services", Series H: Audiovisual and Multimedia Systems, Infrastructure of audiovisual services—Coding of moving video, Recommendation ITU-T H.264, Telecommunication Standardization Sector of ITU, Jan. 2012, pp. 1-680.

ITU-T H.265 Standard, "High Efficiency Video Coding", Series H: Audiovisual and Multimedia Systems, Infrastructure of audiovisual services—Coding of moving video, Recommendation ITU-T H.265, Telecommunication Standardization Sector of ITU, Oct. 2014, pp. 1-540.

Reinhard et al., "Photographic Tone Reproduction for Digital Images", ACM Transactions on Graphics 21, vol. 21, No. 3, Jul. 2002, pp. 267-276.

Boitard et al., "Temporal Coherency for Video Tone Mapping", APplications of Digital Image Processing XXXV, Proceedings of SPIE, vol. 8499, Oct. 15, 2012, pp. 1-10.

* cited by examiner

METHOD AND DEVICE FOR ENCODING BOTH A HIGH-DYNAMIC RANGE FRAME AND AN IMPOSED LOW-DYNAMIC RANGE FRAME

This application claims the benefit, under 35 U.S.C. § 119 of European Patent Application No. 15305926.6, filed Jun. 15, 2015.

1. FIELD OF DISCLOSURE

The present disclosure generally relates to frame/video encoding and decoding. In particular, the technical field of the present disclosure is related to encoding/decoding of a frame whose pixel values belong to a high-dynamic range and of a frame whose pixel values belong to a lower-dynamic range.

2. TECHNICAL BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Standard-Dynamic-Range frames (SDR frames) are frames whose luminance values are represented with a limited number of bits (most often 8 or 10). This limited representation does not allow correct rendering of small signal variations, in particular in dark and bright luminance ranges. In high-dynamic range frames (HDR frames), the signal representation is extended in order to maintain a high accuracy of the signal over its entire range. In HDR frames, pixel values are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A typical approach for encoding a HDR frame is to reduce the dynamic range of the frame in order to encode the frame by means of a legacy encoding scheme (initially configured to encode SDR frames).

According to a well-known approach, a backlight frame is determined from the luminance component of the input HDR frame. A residual frame is then obtained by dividing the input HDR frame by the backlight frame and both the backlight frame and the residual frame are encoded by a legacy encoder such as H.264/AVC (("*Advanced video coding for generic audiovisual Services*", SERIES H: AUDIO-VISUAL AND MULTIMEDIA SYSTEMS, Recommendation ITU-T H.264, Telecommunication Standardization Sector of ITU, January 2012).) or HEVC, SHVC ("*High Efficiency Video Coding*", SERIES H: AUDIOVISUAL AND MULTIMEDIA SYSTEMS, Recommendation ITU-T H.265, Telecommunication Standardization Sector of ITU, October 2014).

Such an encoding approach automatically generates a SDR frame by dividing the HDR frame by a backlight frame obtained from the luminance component of the HDR frame.

Consequently, such an encoding approach is not adapted when a SDR frame is imposed, i.e. is an input of the encoding and shall also be encoded, because there is virtually no chance to get an automatic low-dynamic range frame from the HDR frame close enough (in term of visual content) to the imposed SDR frame.

This occurs, for example, in cinema-oriented use cases where it is expected to obtain from a studio two different color grading: one for a SDR frame obtained from the HDR frame and one for the HDR frame itself. It is, then, virtually impossible from the usual backlight-based method for encoding a HDR frame to get an automatic SDR frame (by dividing the SDR frame by a backlight frame) close enough (in term of visual content) to the artistically graded SDR frame.

3. SUMMARY OF THE DISCLOSURE

The disclosure sets out to remedy some of the drawbacks of the prior art with a method for encoding a frame comprising:
  determining a backlight frame from the frame;
  calculating a residual frame responsive to the frame and the backlight frame; and
  predictive-encoding the residual frame using a predictor of the residual frame calculated from an imposed frame, said imposed frame being a low-dynamic version of the frame to be encoded.

This provides a high efficient method for encoding both a HDR frame and an imposed SDR frame because the residual frame is predictive-encoded using a predictor obtained from the imposed SDR frame which is similar in term of visual content to the residual frame. This reduces the dynamic of the residual frame to be encoded and thus increases the coding efficiency compared to an encoding method which would encode independently the imposed SDR frame and the HDR frame.

Moreover, in the cinema-oriented use cases above, the artistic intents (color grade, etc. . . . ) is preserved for both the HDR frame and the imposed SDR frame.

Next, the method only uses low to medium bit-depth encoders, typically 8-12 bits, which ensures backward compatibility with usual infrastructures.

According to an embodiment, the predictor of the residual frame is calculated from a decoded version of the imposed frame.

According to an embodiment, calculating the predictor of the residual frame comprises mapping the decoded version of the imposed frame to the residual frame by means of a color mapping function.

According to an embodiment, the color mapping function uses a 3D color Look Up Table.

According to an embodiment, the backlight frame is further determined from the imposed frame.

According to an embodiment, determining the backlight frame comprises dividing each component of the frame by a component of the frame IMF.

According to an embodiment, the method further comprises mapping the residual frame before predictive-encoding and inverse-mapping each component of the imposed frame before determining the backlight frame.

According to an embodiment, predictive-encoding the residual frame conforms to the SHVC standard.

The present disclosure further relates to a method for decoding frame from at least one bitstream. The method comprises:
  obtaining a backlight frame by at least partial decoding of a bitstream;

obtaining a decoded imposed frame by at least partial decoding a bitstream, said decoded imposed frame being a low-dynamic version of the frame to be decoded;

obtaining a predictor from the decoded imposed frame;

predictive-decoding a decoded residual frame by at least partially decoding a bitstream and by using the predictor obtained from the decoded imposed frame; and decoding the frame responsive to the decoded residual frame and the decoded backlight frame.

According to an embodiment, the method further comprises:

obtaining parameters related to a 3D color LUT by at least partially decoding a bitstream; and obtaining the predictor from the decoded imposed frame and the obtained parameters.

According to an embodiment, the predictor comprises a specific predictor for each region of a 3D color LUT.

According to an embodiment, predictive-decoding a decoded residual frame conforms to the SHVC standard.

According to other of its aspects, the disclosure relates to a device comprising a processor configured to implement the above method, a computer program product comprising program code instructions to execute the steps of the above method when this program is executed on a computer, a processor readable medium having stored therein instructions for causing a processor to perform at least the steps of the above method, and a non-transitory storage medium carrying instructions of program code for executing steps of the above method when said program is executed on a computing device.

The specific nature of the disclosure as well as other objects, advantages, features and uses of the disclosure will become evident from the following description of a preferred embodiment taken in conjunction with the accompanying drawings.

4. LIST OF FIGURES

The embodiments will be described with reference to the following figures.

5. DETAILED DESCRIPTION OF A PREFERRED EMBODIMENT OF THE DISCLOSURE

Figure 1:
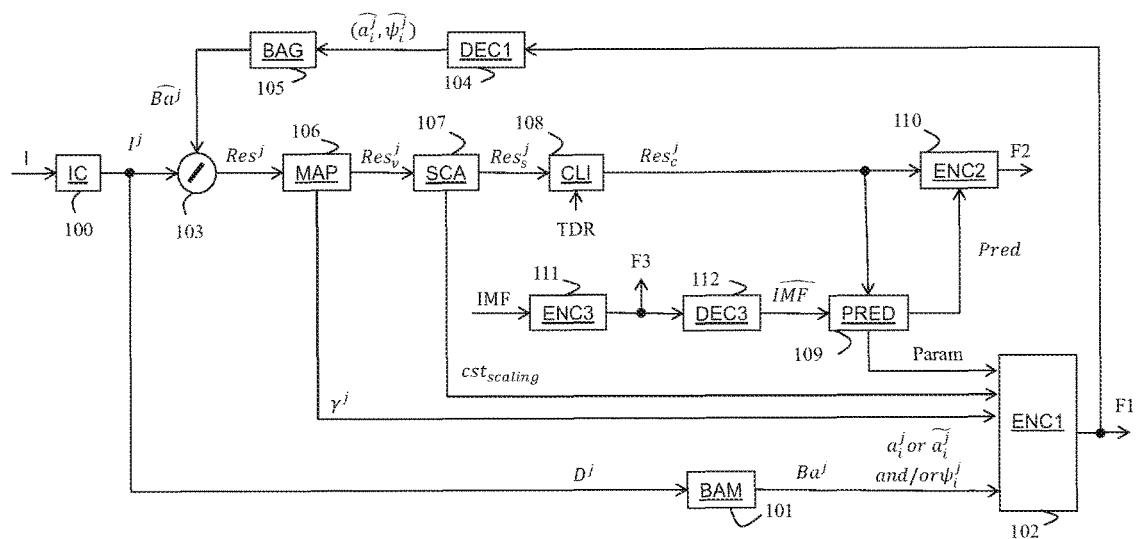
FIG. 1 shows a block diagram of the steps of a method for encoding a frame I in accordance with an example of present principles.

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for encoding/decoding a frame but extends to the encoding/decoding of a sequence of frames (video) because each frame of the sequence is sequentially encoded/decoded as described below.

FIG. 1 shows a block diagram of the steps of a method for encoding a frame I in accordance with an example of present principles.

In step 100, a module IC obtains at least one component $I^j$ of the frame I to be encoded.

In the following, a component $I^{j=1}$ is the luminance component of the frame I and a component $I^{j\neq 1}$ is a color component of the frame I to be encoded.

For example, when the frame I belongs to the color space (X, Y, Z), the luminance component $I^1$ is obtained by a transform f(.) of the component Y, e.g. $I^1 = f(Y)$.

When the frame I belongs to the color space (R,G,B), the luminance component $I^1$ is obtained, for instance in the 709 gamut, by a function of a linear combination which is given by:

$$I^1 = g(0.2127 \cdot R + 0.7152 \cdot G + 0.0722 \cdot B)$$

In step 101, a module BAM determines a component $Ba^j$ of a backlight frame Ba from each component $I^j$ of the frame I.

Figure 3:
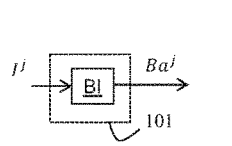
FIG. 3 shows a block diagram of a step of the method in accordance with an example of present principles.

According to an embodiment of the step 101, illustrated in FIG. 3, a module BI determines a component $Ba^j$ of a backlight frame Ba as being a weighted linear combination of shape functions $\psi_i^j$ given by:

$$Ba^j = \Sigma_i a_i^j \psi_i^j \quad (1)$$

with $a_i^j$, being weighting coefficients for the component $Ba^j$.

Thus, determining a component $Ba^j$ of the backlight frame Ba from a component $I^j$ consists in finding the optimal weighting coefficients (and potentially also the optimal shape functions if not known beforehand) in order that the component $Ba^j$ of backlight frame Ba fits the component $I^j$.

There are many well-known methods to find the weighting coefficients $a_i^j$ for a component $Ba^j$. For example, one may use a least mean square error method to minimize the mean square error between the component $Ba^j$ and the component $I^j$.

The disclosure is not limited to any specific method to obtain the backlight frame Ba.

It may be noted that the shape functions may be the true physical response of a display backlight (made of LEDs for instance, each shape function then corresponding to the response of one LED) or may be a pure mathematical construction in order to best fit the luminance component.

According to this embodiment, the backlight frame Ba, output from step 101, is a backlight frame Ba which comprises at least one component given by equation (1).

Figure 4:
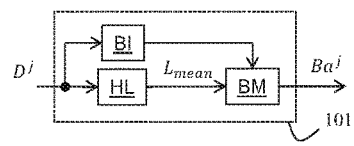
FIG. 4 shows a block diagram of a step of the method in accordance with an example of present principles.

According to embodiment of the step 101, illustrated in FIG. 4, a module BM modulates at least one component $Ba^j$ of the backlight frame Ba (given by equation (1)) with a mean value $L_{mean}$ obtained by the means of a module HL.

Modulating at least one component of the backlight frame with a mean value of the component of the frame improves the global luminance coherence between the component of the frame and the component of the residual frame, e.g. a bright region in the frame appears bright in the residual frame and a dark region in the frame appears dark in the residual frame.

Multiple components are modulated with a same mean value to reduce the dynamic range of these components without modifying their tones.

According to this embodiment, the backlight frame Ba, output from step 101, is the modulated backlight frame.

According to an embodiment, the module HL is configured to calculate the mean value $L_{mean}$ over the whole luma component $I^1$.

According to a variant of this embodiment, the module HL is configured to calculate the mean value $L_{mean}$ by $$L_{mean} = E(I^{1\beta})^{\frac{1}{\beta}}$$

with $\beta$ being a coefficient less than 1 and E(X) the mathematical expectation value (mean) of the component $I^1$.

This last variant is advantageous because it prevents the mean value $L_{mean}$ from being influenced by a few pixels with extreme high values which usually leads to very annoying temporal mean brightness instability when the frame I belongs to a sequence of frames.

The disclosure is not limited to a specific embodiment for calculating the mean value $L_{mean}$.

Figure 5:
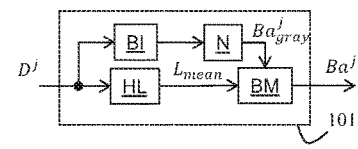
FIG. 5 shows a block diagram of a step of the method in accordance with an example of present principles.

According to a variant, illustrated in FIG. 5, a module N normalizes at least one component $Ba^j$ of the backlight frame Ba (given by equation (1)) by the luma mean value $E(Ba^1)$ such that one gets a mid-gray-at-one component $Ba_{gray}^j$ for the frame (or for all frames if the frame I belongs to a sequence of frames):

$$Ba_{gray}^j = \frac{Ba^j}{E(Ba^1)}$$

Then, the module BM is configured to modulate the mid-gray-at-one component $Ba_{gray}^j$ with the mean value $L_{mean}$ of the component $I^j$, by using the following relation $$Ba_{mod}^j \approx cst_{mod} \cdot L_{mean}^{\alpha} \cdot Ba_{gray}^j \quad (2)$$

with $cst_{mod}$ being a modulation coefficient and $\alpha$ being another modulation coefficient less than 1, typically between 0.3 and 0.5.

According to this variant, the backlight frame Ba1, output from step 101, is a backlight frame which comprises at least one component $Ba_{mod}^j$ given by equation (2).

It may be noted that the modulation coefficient $cst_{mod}$ is tuned to get a good looking brightness for the residual frame and highly depends on the process of obtaining the backlight frame. For example, $cst_{mod} \approx 1.7$ for all the components obtained by least means squares.

Practically, by linearity, all operations to modulate a component $Ba^j$ of the backlight frame apply to the backlight coefficients $a_i^j$ as a correcting factor which transforms the coefficients $a_i^j$ into new coefficients $\bar{a}_i^j$ such that one gets $$Ba_{mod}^j = \sum_i \bar{a}_i^j \psi_i^j$$

In step 102 (FIG. 1), the data needed to determine the backlight frame Ba, output from step 101, are encoded by means of an encoder ENC1 and added in a bitstream F1 which may be stored and/or transmitted over a communication network.

For example, the data to be encoded are limited to the weighting coefficients $a_i^j$ or $\tilde{a}_i^j$ when known non-adaptive shape functions are used, but the shape functions $\psi_i$ may also be a priori unknown and then encoded in the bitstream F1, for instance in a case of a somewhat optimal mathematical construction for better fitting. So, all the weighting coefficients $a_i^j$ or $\tilde{a}_i^j$ (and potentially shape functions $\psi_i^j$) are encoded in the bitstream F1.

Advantageously, the weighting coefficients $a_i^j$ or $\tilde{a}_i^j$ are quantized before encoded in order to reduce the size of the bitstream F1.

According to another example, each component $Ba^j$ of the backlight frame Ba is considered as being a picture which is encoded in the bitstream F1 by the encoder ENC1.

In step 103, a residual frame Res is calculated by dividing the frame I by a decoded version the backlight frame.

It is advantageous to use a decoded version of the backlight frame to ensure a same backlight frame on both encoder and decoder sides, thus leading to a better precision of a final decoded frame $\hat{I}$.

More precisely, each component $I^j$ of the frame I, obtained from the module IC, is divided by a decoded version $\widehat{Ba^j}$ of a component of the backlight frame. This division is done pixel per pixel.

For example, when the components R, G or B of the frame I are expressed in the color space (R,G,B), the component $Res^1$, $Res^2$ and $Res^3$ are obtained as follows:

$$Res^1 = R/\widehat{Ba^1}, \quad Res^2 = G/\widehat{Ba^2}, \quad Res^3 = B/\widehat{Ba^3},$$

For example, when the components X, Y or Z of the frame I are expressed in the color space (X,Y,Z), the component $Res^1$, $Res^2$ and $Res^3$ are obtained as follows:

$$Res^1 = X/\widehat{Ba^1}, \quad Res^2 = Y/\widehat{Ba^2}, \quad Res^3 = Z/\widehat{Ba^3},$$

According to an embodiment, in step 104, the decoded version $\widehat{Ba^j}$ of at least one component of the backlight frame is obtained by decoding at least partially the bitstream F1 by means of a decoder DEC1.

As explained above, some data needed to obtain a component of the backlight frame, output of step 101, have been encoded (step 102) and then obtained by at least partially decoding the bitstream F1.

Following an example given above, weighting coefficients $\widehat{a_i^j}$ (and potentially shape functions $\widehat{\psi_i^j}$ are then obtained as output of step 104.

Then, in step 105, a module BAG generates a decoded version $\widehat{Ba^j}$ of a component of the backlight frame from the weighting coefficients $\widehat{a_i^j}$ and either some known non-adaptive shape functions or the shape functions $\widehat{\psi_i^j}$ by:

$$\widehat{Ba^j} = \sum_i \widehat{a_i^j} \widehat{\psi_i^j}$$

According to another example, the decoded version $\widehat{Ba^j}$ of a component of the backlight frame is directly obtained by decoding the bitstream F1.

In step 106, a module MAP obtains at least one tone-mapped component $Res_v^j$ by tone-mapping at least one component $Res^j$ of the residual frame Res in order to get a viewable residual frame $Res_v$ built from said at least one tone-mapped component $Res_v^j$.

It may appear that the residual frame Res may not be viewable because its dynamic range is too high and because a decoded version of this residual frame Res shows high visible artifacts. Tone-mapping at least one component of the residual frame provides a viewable residual frame in the sense that the tone-mapped residual frame renders artistically a reasonably well and consistently tone-mapped version of the scene compared to the original scene in the frame to be encoded. This method is thus backward compatible because the viewable residual frame may be decoded and/or displayed by a traditional apparatus which is not able to handle high dynamic range.

The capability of providing automatically a viewable SDR frame from the encoded residual frame is a key advantage as it allows distributing the HDR frame (video) to customers equipped with standard SDR TV sets and reception device not dedicated to post-processing both the backlight frame and the residual frame to decode a HDR frame (video).

Moreover, encoding a HDR frame by means of such method leads to an efficient encoding scheme because the tone-mapped residual frame Res, which is highly spatially correlated (and temporally correlated with other frames of a same sequence of frames), and the backlight frame are encoded separately. A coding gain is thus reached because of the high compression rate of the tone-mapped residual frame and of the little amount of data to encode the backlight frame.

The disclosure is not limited to any specific mapping operator. This single condition is that the tone-mapping operator shall be reversible.

For example, the tone-mapping operator defined by Reinhard may be used (Reinhard, E., Stark, M., Shirley, P., and Ferwerda, J., "Photographic tone reproduction for digital frames," *ACM Transactions on Graphics* 21 (July 2002)), or Boitard, R., Bouatouch, K., Cozot, R., Thoreau, D., & Gruson, A. (2012). Temporal coherency for video tone mapping. In A. M. J. van Eijk, C. C. Davis, S. M. Hammel, & A. K. Majumdar (Eds.), *Proc. SPIE* 8499, Applications of Digital Frame Processing (p. 84990D-84990D-10)).

According to an embodiment of the step 106, mapping a component $Res^j$ of the residual frame comprises either a gamma correction or a SLog correction according to the pixel values of the component $Res^1$ of the residual frame.

A component $Res_v^j$ of the viewable residual frame $Res_v$ is then given, for example, by:

$$Res_v^j = A \cdot (Res^j)^{\gamma^j}$$

with A being a constant value, $\gamma^j$ being a coefficient of a gamma curve equal, for example, to 1/2.4.

Alternatively, a component $Res_v^j$ of the viewable residual frame $Res_v$ is given, for example, by:

$$Res_v^j = a^j \cdot \ln(Res^j + b^j) + c^j$$

with $a^j$, $b^j$, $c^j$ being coefficients of a SLog curve determined such that 0 and 1 are invariant, and the derivative of the SLog curve is continuous in 1 when prolonged by a gamma curve below 1. Thus, $a^j$, $b^j$, $c^j$ are functions of the parameter $\gamma^j$.

According to an embodiment, the parameter $\gamma^j$ of the gamma-Slog curve relative to a component of the residual frame is encoded by means of the encoder ENC1 and added in the bitstream F1.

Applying a gamma correction on the luma component of the residual frame Res, pulls up the dark regions but does not lower high lights enough to avoid burning of bright pixels.

Applying a SLog correction on the luma component of the residual frame Res lowers high lights enough but does not pull up the dark regions.

Then, according to a preferred embodiment of the step 106, the module MAP applies either the gamma correction or the SLog correction according to the pixel values of a component of the residual frame Res.

Gamma and SLog corrections, such that there is no loss of dark and bright information, lead to the reconstruction of a HDR frame, from the residual frame and the backlight frame, with high precision. Moreover, gamma and S-log corrections avoid flat clipped areas in both the reconstructed HRD frame and the viewable residual frame.

For example, when the pixel value of a component of the residual frame Res is below a threshold (equal to 1), then the gamma correction is applied and otherwise the SLog correction is applied.

By construction, a component of the viewable residual frame $Res_v$ usually has a mean value more or less close to 1 depending on the brightness of the associated component of the frame I, making the use of the above gamma-Slog combination particularly efficient.

According to an embodiment of the method, in step 107, a module SCA scales at least one component $Res^j$ or $Res_v^j$ of the residual frame before encoding (step 110) by multiplying said component by a scaling factor $cst_{scaling}$.

Scaling the component j of the residual frame puts the mean gray of a frame obtained from the residual frame at an adequate value for both viewing and coding.

The resulting component $Res_s^j$ of the residual frame $Res_s$ is then given by $$Res_s^j = cst_{scaling} \cdot Res_v^j$$

$$Res_s^j = cst_{scaling} \cdot Res^j$$

according to the embodiments of the method.

Preferably, a scaling factor $cst_{scaling}$ is defined to map the values of a component of the residual frame from 0 to the maximum value $2^N-1$, where N is the number of bits allowed as input for the coding by an encoder ENC2.

This is naturally obtained by mapping the luma value 1 (which is roughly the mean value of a component of the residual frame) to the mid-gray luma value $2^{N-1}$. Thus, for a component of the residual frame with a standard number of bits N=8, a scaling factor equal to 120 is a very consistent value because very closed to the neutral gray at $2^7=128$.

According to an embodiment of the method, in step 108, a module CLI clips at least one component of the residual frame before encoding to limit its dynamic range to a targeted dynamic range TDR which is defined, for example, according to the capabilities of the encoder ENC2.

Clipping the residual frame ensures a limited number of bits and allows the use of a traditional encoding/decoding scheme for encoding it. Also, the encoding/decoding scheme is backward compatible with existing infrastructure (codec, displays, distribution channels, etc.) because only the residual frame, which has a low dynamic range, typically 8-10 bits, may be transmitted over such infrastructure to display a low dynamic range version of the frame. The small bit-stream, which contains the backlight data, may be carried in a side container over a dedicated infrastructure to distribute the original version of the frame (i.e. a HDR frame).

According to this last embodiment, a component Rest of the resulting residual frame $Res_c$ is given, for example, by:

$$Res_c^j = \max(2^N, Res_v^j)$$

$$Res_c^j = \max(2^N, Res_s^j)$$

$$Res_c^j = \max(2^N, Res^j)$$

according to the embodiments of the method.

The disclosure is not limited to such clipping (max(.)) but extends to any kind of clipping.

Combining the scaling and clipping embodiments leads to a component $Res_{sc}^j$ of a residual frame $Res_{sc}$ given by:

$$Res_{sc}^j = \max(2^N, cst_{scaling} * Res_v^j)$$

$$Res_{sc}^j = \max(2^N, cst_{scaling} * Res^j)$$

according to the embodiments of the method.

The mapping and scaling of a component of the residual frame is a parametric process. The parameters may be fixed or not and in the latter case they may be encoded in the bitstream F1 by means of the encoder ENC1.

According to an embodiment of the method, the constant value $\gamma$ of the gamma correction, the scaling factor $cst_{scaling}$ may be parameters which are encoded in the bitstream F1.

It may be noted that the choice of the parameters $\alpha$, $cst_{mod}$, $cst_{scaling}$, $\gamma^j$, $\beta$ gives room for the choice of the mapping which suits the content the best following the taste of an expert in post-production and color grading.

On the other hand, universal parameters may be defined in order to be acceptable for all of a large variety of frames. Then, no parameters are encoded in the bitstream F1.

According to the disclosure, in step 110, the residual frame Res ($Res_v$, $Res_s$ or $Res_c$) is predictive-encoded by means of the encoder ENC2 using a predictor Pred, and added in a bitstream F2 which may be stored and/or transmitted over a communication network.

According to the disclosure, in step 109, the predictor Pred of the residual frame Res ($Res_v$, $Res_s$ or $Res_c$) is calculated from a decoded version $\widehat{IMF}$ of an imposed frame IMF, output of step 112.

The term "imposed" stands for that the frame IMF is different of the residual frame Res ($Res_v$, $Res_s$ or $Res_c$). The frame IMF is low-dynamic range version of the frame I. The frame IMF and the frame I may have been differently color-graded by artists and/or be expressed in different color spaces (Rec. 709 for the frame IMF and REC.2020 color space for the frame I for example).

According to an embodiment of the step 109, calculating the predictor Pred comprises mapping the decoded version $\widehat{IMF}$ of the imposed frame IMF to the residual frame Res ($Res_v$, $Res_s$ or $Res_c$) by means of a Color Mapping Function (CMF).

This improves the coding efficiency of the predictive-encoder ENC2 because the dynamic of the residual calculated between the residual frame and the predictor Pred is then reduced.

The color mapping function CMF may depend on the color spaces of the frames I and IMF, and on the content itself too. Indeed, at the frame content creation, some color corrections are operated (color grading, etc. . . . ) on either the frame I or the frame IMF or both depending on the content creator artistic intent. These color transformations applied to the components of the frames I and IMF can be different. Then, in the general case, the colour mapping function CMF is not reduced to a simple deterministic color space transform.

According to an embodiment, the color mapping function CMF uses a 3D color Look Up Table (3D color LUT) such as defined in HEVC subsection F.7.3.2.3.5 "Colour mapping octants syntax" for the syntax and subsection F.7.4.3.3.5 "Colour mapping octants semantics" for the semantics).

Figure 7:
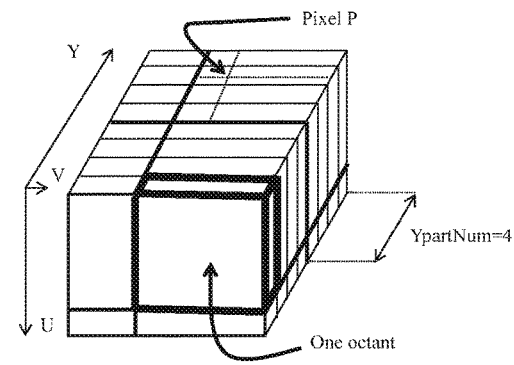
FIG. 7 shows an example of a 3D color LUT.

A 3D color LUT is usually represented as a grid of octants as depicted on FIG. 7 for a 3D color space. The grid divides a color space into N regions Ri, with i ∈ [0,N−1], N being an integer. The region partitioning may be either symmetrical or asymmetrical (unequally divided). A region is also called an octant. At least one parameter is associated with each octant such as described in subsections F.7.3.2.3.4 "General colour mapping table syntax" and F.7.3.2.3.5 "Colour mapping octants syntax" of HEVC. The color mapping function CMF is then defined when all the octants have at least one associated parameter. Usually, the color mapping function CMF is further associated with an interpolation function described in HEVC in subsections H.8.1.4.3.1 "Colour mapping process of luma sample values" and H.8.1.4.3.2 "Colour mapping process of chroma sample values".

Figure 2:
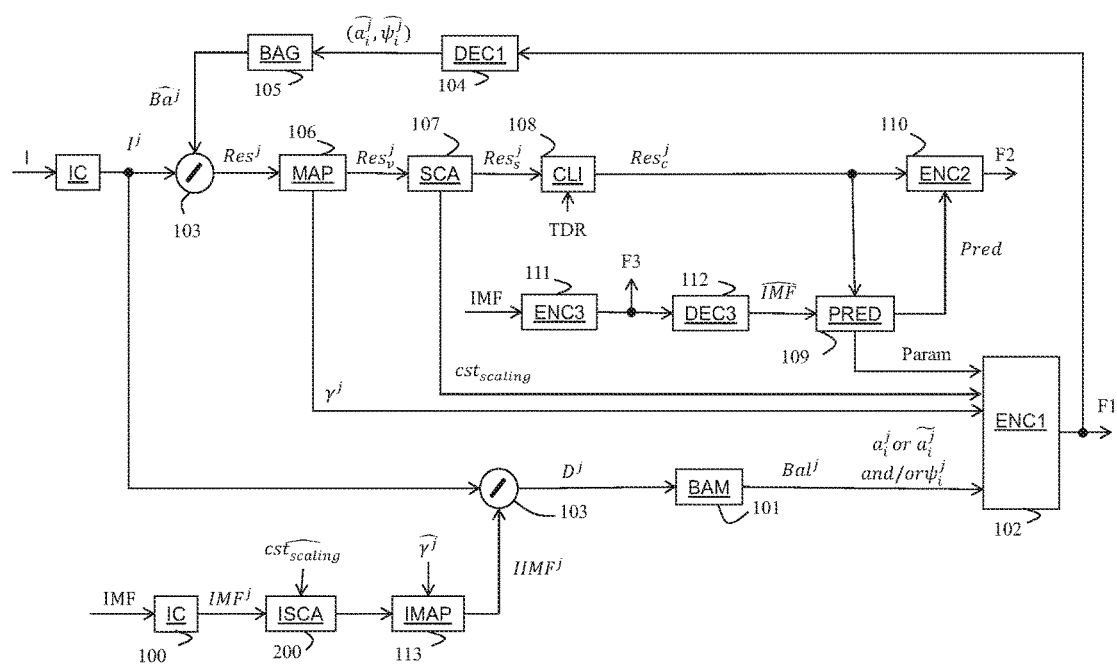
FIG. 2 shows a block diagram of the steps of a method for encoding a frame I in accordance with an example of present principles.

According to an embodiment of the method, illustrated in FIG. 2, in step 100, the module IC obtains at least component $IMF^j$ of the frame IMF.

When at least one component of the residual frame $Res_v$ is scaled (step 107), in step 200, a module ISCA applied an inverse scaling to the at least one component $IMF^j$ of the frame IMF by dividing said component by the parameter $\widehat{cst_{scaling}}$ which is obtained either from a local memory or by at least partial decoding of the bitstream F1 by means of the decoder DEC1.

In step 113, a module IMAP obtains an inverse-mapped version of at least one component obtained either from the step 100 or from the step 200, by applying an inverse-mapping operator on said at least one obtained component. Said inverse-mapping operator is the inverse of the mapping operator applies on the component(s) of residual frame in step 106.

The parameters $\widehat{\gamma^j}$ is obtained either from a local memory or by at least partial decoding of the bitstream F1 by means of the decoder DEC1.

In the following, the inverse-scaled version of a component of the frame IMF, (output of step 200), or its inverse-mapped version (output of step 113) is called the component $IIMF^j$.

In step 103, a component $D^j$, input of the step 101, is then calculated by dividing each component $I^j$ of the frame I by a component $IIMF^j$.

In step 101, the module BAM determines a component $Ba^j$ of a backlight frame Ba from each component D as explained above for the component $I^j$ of the frame I.

Figure 6:
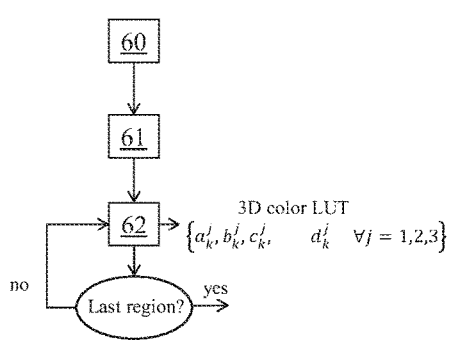
FIG. 6 depicts a flowchart of a method for creating a 3D color LUT according to an example of present principles.

FIG. 6 depicts a flowchart of a method for creating a 3D color LUT according to an exemplary embodiment of the disclosure.

In a step 60, a structure of the 3D color LUT is determined. Here, a 3D color LUT is usually represented by parameters representative of an octant as described above and as depicted on FIG. 7 for a 3D color space.

In step 61, some regions can be split into multiple octants $R_k$ possibly. In step 62, for each region $R_k$, at least a parameter is determined for each octant from the pixels p of the decoded version of frame IMF or from some of them whose color value belong to said region $R_k$ and from spatially corresponding pixels p' in the residual frame Res (or $Res_v$, $Res_s$ or $Res_c$ according to embodiments of the disclosure).

According to a variant, only a subset (e.g. one out of 2) of the pixels of the decoded version of the frame IMF is considered in order to speed-up the process.

According to a variant, a spatially corresponding pixel p' is either a co-located pixel or a pixel having a corresponding spatial position subject to a spatial transform (e.g. up-sampled, translation, etc.).

Thus, the parameters associated with the octants are determined locally per region which eases the computations since a lower number of parameters is handle at a time.

According to an embodiment of the step 62, determining at least a parameter associated with an octant of a current region $R_k$ comprises determining parameters of a color mapping function $CMF_k$ that minimize a distance between a remapped version (by the color mapping function $CMF_k$) of the color values $\widehat{IMF(p)}$ of the pixels p of the decoded version of the frame IMF (or a subset of them), whose color values belong to said region $R_k$, and the color values Res(p) of the spatially corresponding pixels p' in the residual frame Res ($Res_v$ or $Res_s$ or $Res_c$). For example, the parameters of $CMF_k$ for the region $R_k$ are those that minimize the following equation:

$$\text{dist}(CMF_k(\widehat{IMF(p)}), Res(p)) \qquad (3)$$

where dist is a distance metric. As an example, dist is a L1-norm or L2-norm.

According to a variant, dist is a weighted difference.

According to an example, the parameters of $CMF_k$ are determined by a well-known least square error minimization technique.

Once the parameters of $CMF_k$ have been determined, the parameters of the octants of the region $R_k$ are then determined. For an octant Oc(x,y,z), its associated parameters value(s) is set as $CMF_k(Oc(x,y,z))$.

Mathematically speaking, when the residual frame Res comprises three components, the color mapping function $CMF_k$ can be a parametric model with a 3×3 matrix parameters: $\{a_k^j, b_k^j, c_k^j, \forall j=1, 2, 3\}$ and three offset parameters $\{d_k^j, \forall j=1, 2, 3\}$ where a component $Pred_k^j$ of the predictor $Pred_k$ for a region $R_k$ is given by:

$$Pred_k^j(p') = a_k^j * \Delta^1(p) + b_k^j * \Delta^2(p) + c_k^j * \Delta^3(p) + d_k^j \qquad (4)$$

with $\Delta^1(p)$, $\Delta^2(p)$ and $\Delta^3(p)$ are the differences between the value of the component $Res^1$ (respectively $Res^2$ and $Res^3$) and the relative component of the current octant coordinates. The parameters $\{a_k^j, b_k^j, c_k^j, d_k^j \forall j=1, 2, 3\}$ are obtained from the 3D color LUT.

In a variant as described in SHVC section H.8.1.4.3, $\Delta^1(p)$, $\Delta^2(p)$ and $\Delta^3(p)$ are the value of the component $Res^1$ (respectively $Res^2$ and $Res^3$).

The disclosure is not limited to the use of a 3×3 matrix with offset function but may extend to any parametric mapping function providing their partial derivatives.

Note, the decoded version of the frame IMF can be replaced by a first sequence of frames and the residual frame by a second sequence of frames. In this case, for each region or octant $R_k$, parameters are determined from a remapped version of the color values of the pixels p of the first sequence of frames (whose color values belong to said region $R_k$) and from the color values of the spatially corresponding pixels p' in the second sequence of frames. In this case a spatially corresponding pixel p' in the second sequence of frames belong to a frame temporally aligned with the frame to which the pixel p belong.

Several color parameters can be associated with each octant of a 3D color LUT, e.g. 4 color values such as RGB color values, Y'CbCr or YUV.

Figure 8:
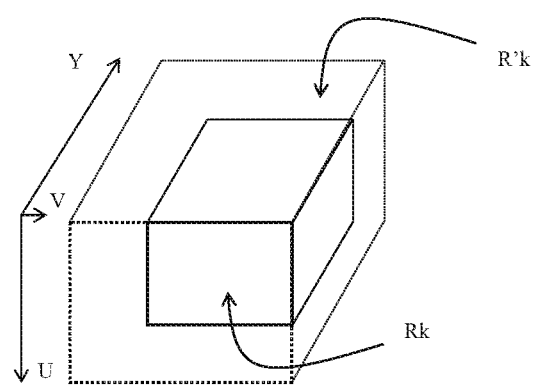
FIG. 8 shows another example of a 3D color LUT.

The minimization of equation (3) does not always have a solution. Indeed, the minimization uses a matrix inversion. In some cases, the matrix is badly configured and the inversion fails (e.g., the determinant of the matrix is null). In addition, when the number of pixels whose color values falls in a given region are below a threshold value, the minimization is not accurate. In this case, when minimizing said distance fails for said region $R_k$, obtaining the color parameters comprises interpolating the parameters of said region from the parameters of a region encompassing $R_k$ or calculating them directly from the parameters of a color transform calculated on a region encompassing said current region. As an example, the color parameters of $R_k$ are calculated from the 3×3 matrix and offset function with parameters determined for the region $R'_k$ encompassing the region $R_k$ as illustrated on FIG. 8.

According to a variant, the color parameters of the region $R_k$ are interpolated from the color parameters of region $R'_k$.

According to a variant, the color parameters of the region $R_k$ are predicted from the color parameters of region $R'_k$ and residuals are encoded.

According to an embodiment, the parameters Param are encoded by means of the encoder ENC1 and added in the bitstream F1. These parameters Param may be associated with the octant of the 3D color LUT, a data determining the octant at which each pixel of the residual frame belongs, and the parameters of each color mapping function $CMF_k$ ($\{a_k^j, b_k^j, c_k^j, d_k^j \; \forall j=1, 2, 3\}$). In a variant, the parameters associated with the octant of the 3D color LUT and/or the parameters of each color mapping function $CMF_k$ ($\{a_k^j, b_k^j, c_k^j, d_k^j \; \forall j=1, 2, 3\}$) are not encoded.

According to a variant of the disclosure, the same parameters $\{a^j, b^j, c^j, d^j, \forall j=1, 2, 3\}$ are used for each color mapping function $CMF_k$.

Figure 9:
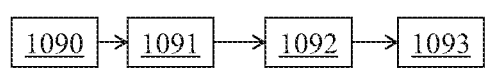
FIG. 9 shows a diagram of the substeps of the step 109 when a color mapping function uses a 3D color LUT.

FIG. 9 shows a diagram of the substeps of the step 109 when a color mapping function CMF uses a 3D color LUT for determining a mapped color value of a pixel p.

In step 1090, for a given pixel p of the decoded version of the frame IMF, the octant CO to which the pixel p belongs is determined. This can be easily determined based on the values of the first N MSBs (Most Significant Bits) of the color components of the pixel p when each dimension of the 3D color LUT is partitioned dyadically.

Optionally, in step 1091, as described in chapter H.8.1.4.3.1 of HEVC and in JCTVC-Q0048_r1 in chapter "2.1 (y, u, v) triplet adjustment when phase alignment is enabled", some adjustments of the components are applied. For example when pixels of the luminance and chroma components are not aligned (typically when a 4:2:0 format is used), the spatial locations of the pixels of the luminance and chroma components are adjusted (resampling of texture and motion), or when the bit depths are not the same, the bit depth of the components are also adapted. For example, as depicted in chapter H.8.1.4.3.1 of JCTVC-R1030_v6, the bit depth may be shifted by an amount as follows:

$n$MappingShift=10+BitDepthCmInput$Y$−BitDepthCmOutput$Y$

In step 1092, a predicted color value associated with a pixel of the residual frame is thus given by equation (4).

Optionally when an alignment and/or adaption in the step 1091 occurred, in step 1093, an inverse alignment and/or adaption is applied to the predicted (mapped) color values.

Figure 10:
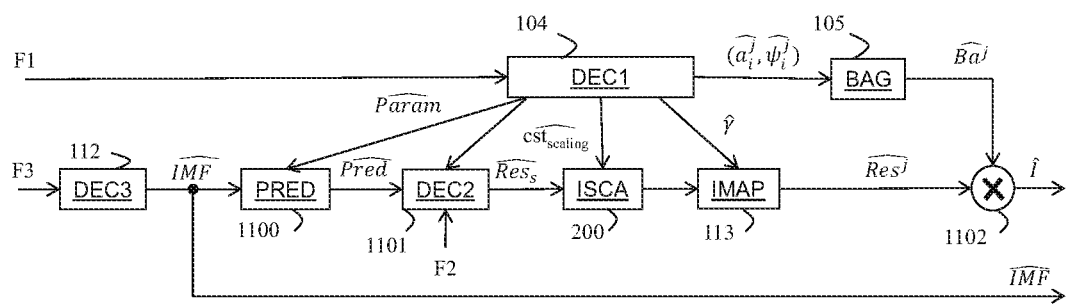
FIG. 10 shows a block diagram of the steps of a method, in accordance with an example of present principles, for decoding a bitstream representing a residual frame calculated by dividing an frame by a backlight frame.

FIG. 10 shows a block diagram of the steps of a method, in accordance with an embodiment of the disclosure, for decoding a bitstream representing a residual frame calculated by dividing an frame by a backlight frame.

As explained above, in steps 104 and 105, a decoded backlight frame $\widehat{Ba}$ is obtained by at least partial decoding of a bitstream F1 by means of the decoder DEC1. The bitstream F1 may have been stored locally or received from a communication network.

In step 112, a decoded frame $\widehat{IMF}$ is obtained by at least partially decoding of the bitstream F3.

In step 1100, a predictor $\widehat{Pred}$ is obtained from the frame $\widehat{IMF}$ and some parameters $\widehat{Param}$ relative to the 3D color LUT. The parameters $\widehat{Param}$ are obtained either from a memory or by at least partial decoding of the bitstream F1.

These parameters Param may be associated with the octants of the 3D color LUT, a data determining the octant in which each pixel of the residual frame belongs, and the parameters of each color mapping function $CMF_k$ ($\{a_k^j, b_k^j, c_k^j, d_k^j \; \forall j=1, 2, 3\}$).

In a variant, the color parameters associated with the (octants of the) 3D color LUT and/or the parameters of each color mapping function $CMF_k$ ($\{a_k^j, b_k^j, c_k^j, d_k^j \; \forall j=1, 2, 3\}$) are obtained from a local memory.

A predictor $\widehat{Pred_k}$ is then obtained from the parameters associated with the octants of each region $R_k$ of a 3D color LUT having a grid structure and the parameters of each color mapping function $CMF_k$ ($\{a_k^j, b_k^j, c_k^j, d_k^j \; \forall j=1, 2, 3\}$) relative to a region $R_k$.

In step 1101, a decoded residual frame $\widehat{Res}$ is predictive-decoded by at least partial decoding of a bitstream F2 by means of a decoder DEC2 and by using the predictor $\widehat{Pred}$. The bitstream F2 may have been stored locally or received from a communication network.

According to an embodiment of the step 1101, the predictor comprises a specific predictor $\widehat{Pred_k}$ for each region $R_k$ of the 3D color LUT.

Then, the method obtains the data which determines the octant CO to which each pixel p' of the residual frame belongs by at least partially decoding of the bitstream F1, and the color value of each pixel p' of the decoded residual frame $\widehat{Res}$ which belong to a region $R_k$ is decoded by predictive-decoding at least partially the bitstream F2 by means of the decoder DEC2 and by using the predictor $\widehat{Pred_k}$ relative to the region $R_k$.

In step 1102, a component of the decoded frame $\hat{I}$ is obtained by multiplying a component $\widehat{Res^j}$ of the decoded residual frame $\widehat{Res}$ by a component $\widehat{Ba^j}$ of the decoded backlight frame $\widehat{B_a}$.

According to an embodiment of step 104, the parameters $\hat{\gamma}$ and/or $\widehat{cst_{scaling}}$ are also obtained either from a local memory or by at least partial decoding of the bitstream B1 by means of the decoder DEC1.

According to the method, in step 200, the module ISCA applied at least one component $\widehat{Res^j}$ of the decoded residual frame $\widehat{Res}$ by dividing said component by the parameter $\widehat{cst_{scaling}}$.

In step 113, the module IMAP obtains an inverse-mapped version of at least one component obtained either output of the step 1101 or output of the step 200, by applying an inverse-mapping operator on said at least one obtained component.

According to an embodiment, the module IMAP uses the parameters $\gamma^j$.

For example, the parameter $\gamma^j$ defines a gamma curve and the inverse-tone-mapping consists in finding, from the gamma curve, the values which correspond to the pixel values of the decoded residual frame $\widetilde{Res}$. The decoders DEC1, DEC2 and DEC3, are configured to decode data which have been encoded by the encoder ENC1 ENC2 and ENC3, respectively.

The encoders ENC1, ENC2 and ENC3 (and decoders DEC1, DEC2 and DEC3) are not limited to a specific encoder (decoder) but when an entropy encoder (decoder) is required, an entropy encoder such as a Huffmann coder, an arithmetic coder or a context adaptive coder like Cabac used in H.264/AVC or HEVC is advantageous.

The encoders ENC1 and ENC3 (and decoders DEC1 and DEC3) are not limited to a specific encoder which may be, for example, a frame/video coder with loss like JPEG, JPEG2000, MPEG2, h264/AVC or HEVC.

The encoder ENC2 (and decoder DEC2) is not limited to any predictive-encoder using a predictor such as JPEG, JPEG2000, MPEG2, H.264/AVC or HEVC.

The encoders ENC1, ENC2 and ENC3 (decoders DEC1, DEC2 and DEC3) may be a same encoder (respectively the same decoder) such as, for example the encoder (decoder) conforms to the standard SHVC. A single bitstream is then generated comprising the data carried by the bitstreams F1, F2 and F3.

According to an embodiment of the disclosure, the data carried by the bitstream F1 and/or the data carried by the bitstream F3 is/are encoded as an auxiliary picture whose syntax conforms either to the H264/AVC, HEVC or SHVC standard. Auxiliary pictures have been defined in the H264/AVC or HEVC or SHVC standard in addition to the so-called "primary coded picture", which actually correspond to the main stream (main video) of the content. Auxiliary pictures enable usually the transport of additional frame information such as alpha compositing, chroma enhancement information or depth information for 3D applications.

According to an embodiment of the disclosure, the predictive-encoded residual frame is embedded in the bitstream F2 as a primary picture whose syntax conforms either to the H.264/AVC or HEVC standard.

This allows to get a single bitstream which is fully compliant with either the H.264/AVC or HEVC standard and which comprises data needed to decode a predictive-encoded residual frame using a 3D color LUT, the encoded imposed frame IMF and the data needed to determine the backlight frame Bal. The decoding method of auxiliary data, which takes place before the display, conforms to the HEVC specification, thus is used as is, in its already specified form.

According to an embodiment of the disclosure, the backlight frame Bal, output from step 101, and the frame IMF are packed in a single frame SF according to a specific frame-packing-arrangement scheme. An encoder encodes the frame SF into a bitstream.

According to an embodiment, the single frame SF is encoded according to encoding parameters which depend on the specific frame-packing-arrangement scheme.

According to a variant of this embodiment, the encoding parameters are defined in order that the single frame SF be encoded in two distinct slices, one containing the frame IMF and the other slice containing the backlight frame Bal. These slices may also take the form of slice groups, tiles, tile groups, precincts, according to the standard encoding scheme employed (H.264/AVC, HEVC, JPEG2000).

This variant is advantageous because it allows that a specific processing, such a specific encoding, to be applied on the backlight frame, respectively the frame IMF, and not on the frame IMF, respectively the backlight frame.

The bitstream comprises thus the single frame SF which contains samples of two distinct packed constituent frames: the frame IMF and the backlight frame. A decoder decodes at least partially the bitstream and obtains the frame IMF and, if needed, the backlight frame from the decoded single frame SF.

On FIGS. 1-5 and 9-10, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 11:
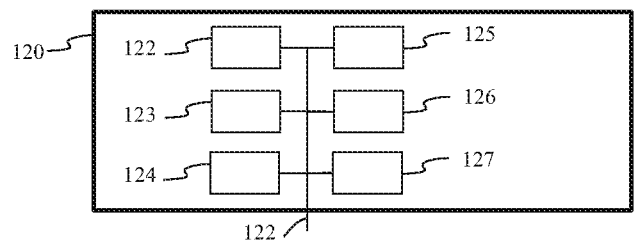
FIG. 11 shows an example of an architecture of a device.

FIG. 11 represents an exemplary architecture of a device 120 which may be configured to implement a method described in relation with FIGS. 1-5 and 9-10.

Device 120 comprises following elements that are linked together by a data and address bus 121:
- a microprocessor 122 (or CPU), which is, for example, a DSP (or Digital Signal Processor);
- a ROM (or Read Only Memory) 123;
- a RAM (or Random Access Memory) 124;
- an I/O interface 125 for reception of data to transmit, from an application; and
- a battery 126

According to a variant, the battery 126 is external to the device. Each of these elements of FIG. 11 are well-known by those skilled in the art and won't be disclosed further. In each of mentioned memory, the word «register» used in the specification can correspond to area of small capacity (some bits) or to very large area (e.g. a whole program or large amount of received or decoded data). ROM 123 comprises at least a program and parameters. Algorithm of the methods according to the disclosure is stored in the ROM 123. When switched on, the CPU 122 uploads the program in the RAM and executes the corresponding instructions.

RAM 124 comprises, in a register, the program executed by the CPU 122 and uploaded after switch on of the device 120, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, the frame I is obtained from a source. For example, the source belongs to a set comprising:

- a local memory (123 or 124), e.g. a video memory or a RAM (or Random Access Memory), a flash memory, a ROM (or Read Only Memory), a hard disk;
- a storage interface (125), e.g. an interface with a mass storage, a RAM, a flash memory, a ROM, an optical disc or a magnetic support;
- a communication interface (125), e.g. a wireline interface (for example a bus interface, a wide area network interface, a local area network interface) or a wireless interface (such as a IEEE 802.11 interface or a Bluetooth® interface); and
- an frame capturing circuit (e.g. a sensor such as, for example, a CCD (or Charge-Coupled Device) or CMOS (or Complementary Metal-Oxide-Semiconductor)).

According to different embodiments of the decoding or decoder, the decoded frame Î is sent to a destination; specifically, the destination belongs to a set comprising:

- a local memory (123 or 124), e.g. a video memory or a RAM, a flash memory, a hard disk;
- a storage interface (125), e.g. an interface with a mass storage, a RAM, a flash memory, a ROM, an optical disc or a magnetic support;
- a communication interface (125), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

According to different embodiments of encoding or encoder, the bitstream BF and/or F are sent to a destination. As an example, one of bitstream F and BF or both bitstreams F and BF are stored in a local or remote memory, e.g. a video memory (124) or a RAM (124), a hard disk (123). In a variant, one or both bitstreams are sent to a storage interface (125), e.g. an interface with a mass storage, a flash memory, ROM, an optical disc or a magnetic support and/or transmitted over a communication interface (125), e.g. an interface to a point to point link, a communication bus, a point to multipoint link or a broadcast network.

According to different embodiments of decoding or decoder, the bitstream BF and/or F is obtained from a source. Exemplarily, the bitstream is read from a local memory, e.g. a video memory (124), a RAM (124), a ROM (123), a flash memory (123) or a hard disk (123). In a variant, the bitstream is received from a storage interface (125), e.g. an interface with a mass storage, a RAM, a ROM, a flash memory, an optical disc or a magnetic support and/or received from a communication interface (125), e.g. an interface to a point to point link, a bus, a point to multipoint link or a broadcast network.

According to different embodiments, device 120 being configured to implement an encoding method described in relation with FIGS. 1-6 and 10, belongs to a set comprising:

- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

According to different embodiments, device 60 being configured to implement a decoding method described in relation with FIG. 10, belongs to a set comprising:

- a mobile device;
- a communication device;
- a game device;
- a set top box;
- a TV set;
- a tablet (or tablet computer);
- a laptop;
- a display and
- a decoding chip.

Figure 12:
FIG. 12 shows two remote devices communicating over a communication network.

According to an embodiment illustrated in FIG. 12, in a transmission context between two remote devices A and B over a communication network NET, the device A comprises means which are configured to implement a method for encoding a frame as described in relation with the FIG. 1 or 2 and the device B comprises means which are configured to implement a method for decoding as described in relation with FIG. 10.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a frame whose pixel vales belong to a high-dynamic range and an imposed frame whose pixel values belong to a lower-dynamic range, wherein the method comprises:
   determining a backlight frame from the luminance component of the frame;
   calculating a residual frame responsive to the frame and the backlight frame; and
   predictive-encoding the residual frame using a predictor of the residual frame calculated from said imposed frame, said imposed frame being a low-dynamic version of the frame to be encoded.

2. The method of claim 1, wherein the imposed frame and the frame to be encoded have different color-grading.

3. The method of claim 1, wherein the imposed frame and the frame to be encoded are expressed in different color spaces.

4. The method according to claim 1, wherein the predictor of the residual frame is calculated from a decoded version of the imposed frame.

5. The method according to claim 1, wherein calculating the predictor of the residual frame comprises mapping the decoded version of the imposed frame to the residual frame by using a color mapping function.

6. The method according to the claim 5, wherein the color mapping function uses a 3D color Look Up Table.

7. The method according to claim 1, wherein the backlight frame is further determined from the imposed frame.

8. The method according to the claim 7, wherein determining the backlight frame comprises dividing each component of the frame by a component of the imposed frame.

9. The method according to claim 1, wherein the method further comprises mapping the residual frame before predictive-encoding and inverse-mapping each component of the imposed frame before determining the backlight frame.

10. The method of claim 1, wherein predictive-encoding the residual frame conforms to the SHVC standard.

11. A method for decoding a frame whose pixel values belong to a high-dynamic range from at least one bitstream, the method comprising:
    obtaining a backlight frame by at least partial decoding of a bitstream;
    obtaining a decoded imposed frame by at least partial decoding a bitstream, said decoded imposed frame being a low-dynamic version of the frame to be decoded;
    obtaining a predictor from the decoded imposed frame;
    predictive-decoding a decoded residual frame by at least partially decoding a bitstream and by using the predictor obtained from the decoded imposed frame; and
    decoding the frame responsive to the decoded residual frame and the decoded backlight frame.

12. The method according to claim 11, wherein the method further comprises:
    obtaining parameters related to a 3D color LUT by at least partially decoding a bitstream; and
    obtaining the predictor from the decoded imposed frame and the obtained parameters.

13. The method according to the claim 11, wherein the predictor comprises a specific predictor for each region of a 3D color LUT.

14. The method of claim 11, wherein predictive-decoding a decoded residual frame conforms to the SHVC standard.

15. A device for encoding a frame whose pixel values belong to a high-dynamic range and an imposed frame whose pixel values belong to a lower-dynamic range, wherein the device comprises a processor configured to:
    determine a backlight frame from the luminance component of the frame;
    calculate a residual frame responsive to the frame and the backlight frame; and
    predictive-encode the residual frame using a predictor of the residual frame calculated from an imposed frame, said imposed frame being a low-dynamic version of the frame to be encoded.

16. A device for decoding frame to whose pixel values belong to a high-dynamic range from at least one bitstream, wherein the device comprises a processor configured to:
    obtain a backlight frame by at least partial decoding of a bitstream;
    obtain a frame, a decoded imposed frame, by at least partially decoding a bitstream, said decoded imposed frame being a low-dynamic version of the frame to be decoded;
    obtain a predictor from the decoded imposed frame;
    predictive-decode a decoded residual frame by at least partially decoding a bitstream and by using the predictor obtained from the decoded imposed frame; and
    decode the frame responsive to the decoded residual frame and the decoded backlight frame.

17. A non-transitory program storage device, readable by a computer, tangibly embodying a program of instructions executable by the computer to perform a method for encoding a frame comprising:
    retrieving a frame to encode whose pixel values belong to a high-dynamic range and an imposed frame whose pixel values belong to a lower-dynamic range;
    determining a backlight frame from the luminance component of the frame;
    calculating a residual frame responsive to the frame and the backlight frame; and
    predictive-encoding the residual frame using a predictor of the residual frame calculated from the imposed frame, said imposed frame being a low-dynamic version of the frame to be encoded.

18. A non-transitory program storage device, readable by a computer, tangibly embodying a program of instructions executable by the computer to perform a method for decoding a frame whose pixel values belong to a high-dynamic comprising;
- obtaining a backlight frame by at least partial decoding of a bitstream;
- obtaining a decoded imposed frame by at least partial decoding a bitstream, said decoded imposed frame being a low-dynamic version of the frame to be decoded;
- obtaining a predictor from the decoded imposed frame;
- predictive-decoding a decoded residual frame by at least partially decoding a bitstream and by using the predictor obtained from the decoded imposed frame; and
- decoding the frame responsive to the decoded residual frame and the decoded backlight frame.

* * * * *